US006175373B1

(12) United States Patent
Johnson

(10) Patent No.: US 6,175,373 B1
(45) Date of Patent: Jan. 16, 2001

(54) METHOD AND APPARATUS FOR PRESENTING VIDEO ON A DISPLAY MONITOR ASSOCIATED WITH A COMPUTER

(75) Inventor: Drew S. Johnson, Houston, TX (US)

(73) Assignee: Compaq Computer Corporation, Houston, TX (US)

( * ) Notice: Under 35 U.S.C. 154(b), the term of this patent shall be extended for 0 days.

(21) Appl. No.: 09/303,222

(22) Filed: Apr. 30, 1999

Related U.S. Application Data

(63) Continuation of application No. 08/744,096, filed on Nov. 5, 1996.

(51) Int. Cl.[7] .............................. G06F 13/00; G06T 1/60

(52) U.S. Cl. .......................... 345/511; 345/507; 345/508

(58) Field of Search .................................. 345/202, 185, 345/507, 508, 509, 510, 511, 196; 348/441; 395/162, 873

(56) References Cited

U.S. PATENT DOCUMENTS 4,994,914 2/1991 Wiseman et al. .
5,291,275 * 3/1994 Lumelsky .............................. 348/441
5,404,446 * 4/1995 Bowater et al. ...................... 395/162
5,450,544 * 9/1995 Dixon et al. .......................... 345/202
5,526,024 * 6/1996 Gaglianello et al. ................ 345/185
5,850,572 * 12/1998 Dierke .................................. 395/873

FOREIGN PATENT DOCUMENTS 0 493 881 7/1992 (EP) .
0 539 822 5/1993 (EP) .

OTHER PUBLICATIONS

T. Tatsumi et al., *The Video Processor for a Personal Computer,* IEEE Transactions on Consumer Electronics, vol. 35, No. 3, Aug. 1989 pp. 614–622.

* cited by examiner

*Primary Examiner*—Bipin Shalwala
*Assistant Examiner*—David L. Lewis
(74) *Attorney, Agent, or Firm*—Sharp, Comfort & Merrett, P.C.

(57) ABSTRACT

A display system having a computer, a video source, a graphics refresher and a display monitor, the display system comprising a first buffer for receiving a first portion of video data from the video source; a second buffer for receiving a second portion of video data from the video source; and a third buffer for receiving a third portion of video data from the video source, wherein the graphics refresher generates signals for selectively displaying one of the portions of the video data on the display monitor.

14 Claims, 2 Drawing Sheets

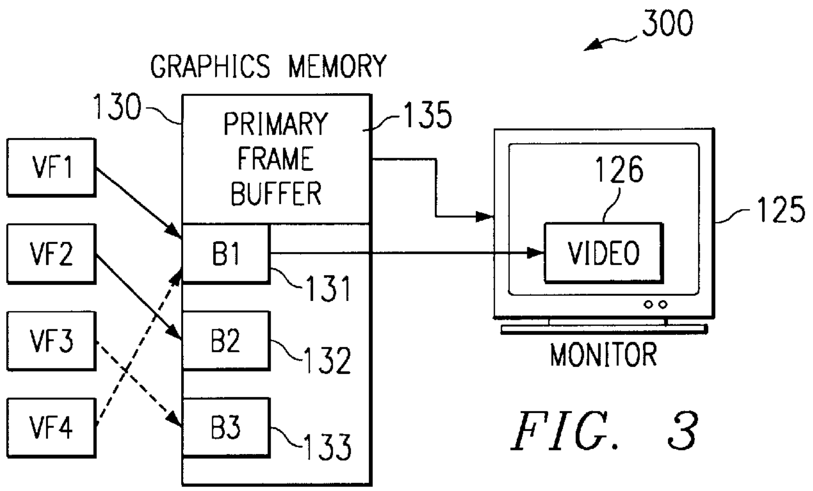
FIG. 3
FIG. 4A
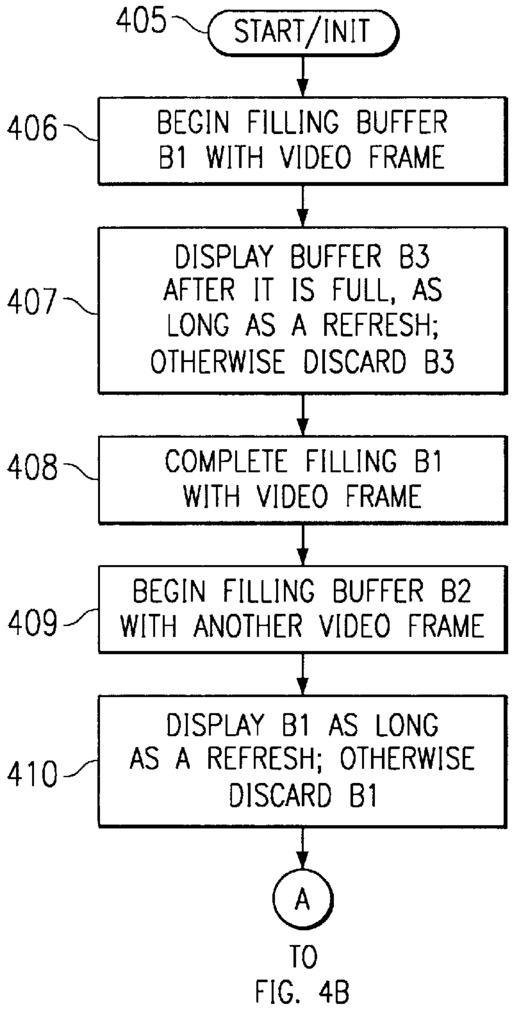
FIG. 4B
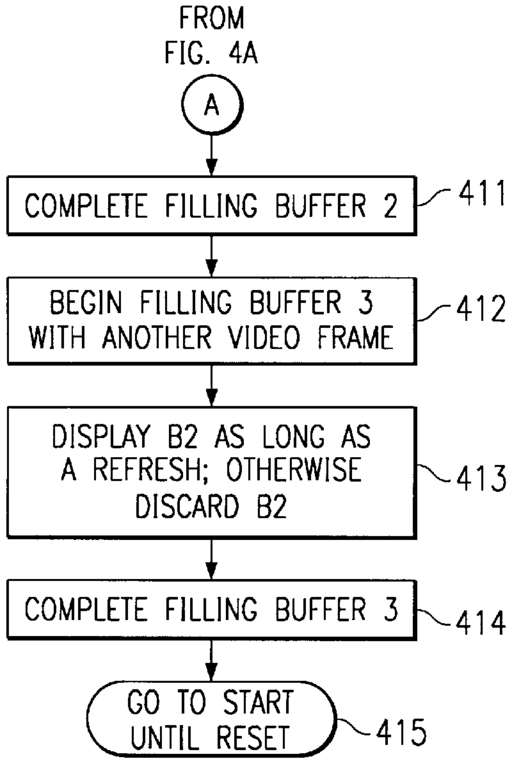

METHOD AND APPARATUS FOR PRESENTING VIDEO ON A DISPLAY MONITOR ASSOCIATED WITH A COMPUTER

This application is a continuation of application Ser. No. 08/744,096, filed Nov. 5, 1996.

BACKGROUND OF THE INVENTION

1. Technical Field of the Invention

The present invention relates to display systems, and, in particular, to a method and apparatus for providing non-genlocked live video on a computer system.

2. Description of Related Art

Personal computer (PC) and television (TV) technologies are presently converging. One of the products of this convergence is a single integrated device for information and entertainment, which device can, at least in part, utilize the available communications bandwidth, mass storage and graphics handling capabilities of the PC to deliver, store and display applications during a traditional TV viewing environment.

In spite of many recent advances in this area, several problems persist. One of the more nettlesome difficulties relates to the presentation of live video on the display monitor associated with a PC. It is well-known in the art that the frame rate of the incoming video must be synchronized to the frame rate of the graphics display system associated with the PC in order to present high quality video thereon. If there is no synchronization, a video anomaly known as "tearing" occurs. Tearing, which is generally obvious and unsettling to viewers, is caused when an update to graphics memory is performed across a graphics controller refresh pointer. As is well known, the severity of the effects of tearing are proportional to the amount of graphics memory that is changed, the location of the graphics controller refresh pointer when the change occurs, and the difference between the old and new graphics memory data. In practical terms, tearing can be caused by writing to the graphics memory (for example, via a bit logical transfer, or "BLT," or when live video data streams in for display) or by changing the memory pointer that the graphics controller uses to refresh the display in the middle of the graphics display sweep.

It is clear that to provide highest quality video on a PC, the graphics display must be genlocked, or synchronized, to the video source. If genlock is possible, a double-buffer memory structure is sufficient to prevent tearing even if the video is displayed at less than full graphics screen resolution. However, as can be appreciated by those skilled in the art, it may not always be possible to genlock the graphics display to the video source. There are several possible reasons for this. For example, it may be because the graphics subsystem hardware in the PC does not support it—currently, few graphics subsystems do. It may also be because more than one source is in use (as would be the case if "picture-in-picture," i.e. "PIP," is in use); it is well-known that it is not feasible to genlock the graphics display to more than one source.

Furthermore, it is well known that if the graphics refresh is not genlocked to the video source, it may be necessary to either drop a video frame or repeat the display of a video frame in order to maintain display synchronization. However, dropping video frames at irregular intervals can result in what are sometimes known as instantaneous syncopation artifacts, highly undesirable visual effects that are akin to the effect caused when a video is played back at a frame rate that is not a whole-number multiple of the frame rate at which the video was recorded. For example, when a film that was recorded at 24 frames per second is transferred to video at 60 fields per second a "three-two pull-down" is performed. The resulting video is composed of three fields from one film frame and two fields of the next film frame. When the video is displayed, one film frame is displayed for $\frac{1}{2}^{th}$ of a second and the next film frame is displayed for $\frac{1}{30}^{th}$ of a second. This syncopation effect can result in visibly "jerky" motion, especially for smoothly scrolling objects. As is well known in the art, dropping frames at irregular intervals may create the most severe and visible instantaneous syncopation effects. In general, the severity of syncopation effects varies with the frequency and magnitude of the mismatches between the recorded and playback frame rates.

Accordingly, based upon the foregoing, it should be understood and appreciated that there is a need for a display system that can display non-genlocked live video on a monitor without the aforementioned anomalies. Although two-buffer display systems have been extant for sometime, no such system is known to have all of the advantages and novel features of the system described and claimed hereinbelow.

SUMMARY OF THE INVENTION

The present invention overcomes the above-identified problems as well as other shortcomings and deficiencies of existing technologies by providing a display system having at least three buffers for storing incoming video frame information. In one embodiment, the present invention provides a display system having a computer, a video source, a graphics refresher and a display monitor, the display system comprising: a first buffer for receiving a first portion of video data from the video source; a second buffer for receiving a second portion of video data from the video source; and a third buffer for receiving a third portion of video data from the video source, wherein the graphics refresher generates signals for selectively displaying one of the portions of the video data on the display monitor. In a further aspect, the three buffers are integrated into a single memory structure.

In a further embodiment, the present invention provides a display system comprising: a video source generating video information at a first frequency; and a graphics refresher providing refresh signals to a display monitor at a second frequency.

The present invention also relates to a method for providing live video from a video source on a computer system using a first buffer, a second buffer and a third buffer, the computer system having a display monitor controlled by a graphics refresher, the graphics refresher providing graphics refresh signals, the method comprising the steps of: (A) commencing the filling of the first buffer with a first portion of video data from the video source; (B) displaying the contents of the third buffer after it is full with a third portion of video data from the video source, as long as a graphics refresh signal is provided, otherwise discarding the contents of the third buffer; (C) completing the filling of the first buffer with the first portion of video data from the video source; (D) commencing the filling of the second buffer with a second portion of video data from the video source; (E) displaying the contents of the first buffer after the first buffer is full with the first portion of video data from the video source, as long as a graphics refresh signal is provided, otherwise discarding the contents of the first buffer; (F)

completing the filling of the second buffer with the second portion of video data from the video source; (G) commencing the filling of the third buffer with the third portion of video data from the video source; (H) displaying the contents of the second buffer after the second buffer is full with the second portion of video data from the video source, as long as a graphics refresh signal is provided, otherwise discarding the contents of the second buffer; (I) completing the filling of the third buffer with the third portion of video data from the video source; and(J) repeating steps (A) through (I) until a system reset.

BRIEF DESCRIPTION OF THE DRAWINGS

A more complete understanding of the present invention may be had by reference to the following Detailed Description when taken in conjunction with the accompanying Drawings wherein:

FIG. 3 depicts a block diagram for a triple buffer display system for a non-genlocked graphics refresh and a video source according to the present invention; and FIGS. 4A and 4B illustrate an exemplary flow diagram for the display method that utilizes three buffers in accordance with the teachings of the present invention.

DETAILED DESCRIPTION OF THE DRAWINGS

Figure 1A:
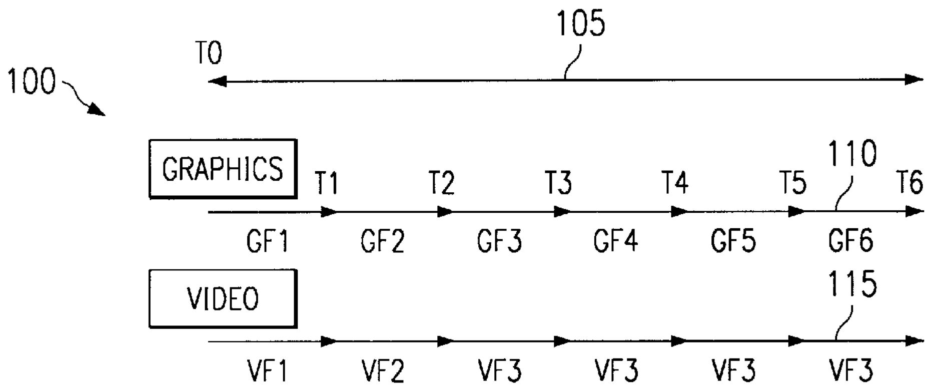
FIG. 1A illustrates a timeline diagram for a genlocked graphics refresh and a video source.

Referring now to the Drawings wherein like or similar elements are designated with identical reference numerals throughout the several views, and wherein the various elements depicted are not necessarily drawn to scale, and, in particular, to FIG. 1A, there is shown a timeline diagram, generally at 100, for a graphics refresh that is genlocked to a video source. Reference numeral 105 refers to a reference time-frame. A graphics refresh is chronologically depicted on a graphics refresh timeframe 110. Similarly, a genlocked video source is chronologically depicted on a video source time-frame 115. Further details regarding the meaning of FIG. 1A are set forth hereinbelow, wherein the timeline diagram 100 is discussed in connection with FIG. 1B.

Figure 1B:
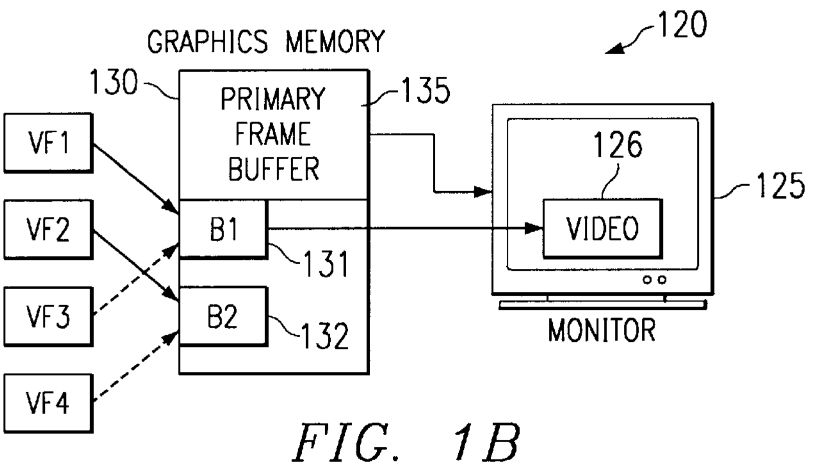
FIG. 1B depicts a block diagram for 2-buffer utilization for a genlocked graphics refresh and a video source.

FIG. 1B depicts a block diagram, generally at 120, for a conventional 2-buffer system utilized for a genlocked graphics refresh and a video source. A graphics memory 130 comprises a primary frame buffer 135, a first buffer 131, and a second buffer 132. Primary frame buffer 135 controls the full-screen display on a monitor 125. First buffer 131 and second buffer 132 store video information in video frames which are displayed in a PIP 126 on the monitor 125.

Taking FIGS. 1A and 1B together, the general operation of the conventional 2-buffer system can now be described. As provided above, the graphics refresh is genlocked to the video source, that is, the vertical syncs of incoming video and a graphics controller (not shown) are matched at T0 on time-frame 105. A video port (not shown) receives a video frame (VF1) and fills it in first buffer 131 during the time period T0–T1. Simultaneously, the graphics controller displays the video data from second buffer 132. At the end of T1, first buffer 131 is full and the graphics controller switches to displaying the data therefrom in response to a graphics refresh signal. Contemporaneously, second buffer 132 starts getting filled up with the next video frame of information (VF2). As can be appreciated, there is no tearing anomaly even if the video displayed at less than full-screen resolution because a complete video frame of information is available for display at the beginning of every graphics refresh period on time-frame 110.

Figure 2:
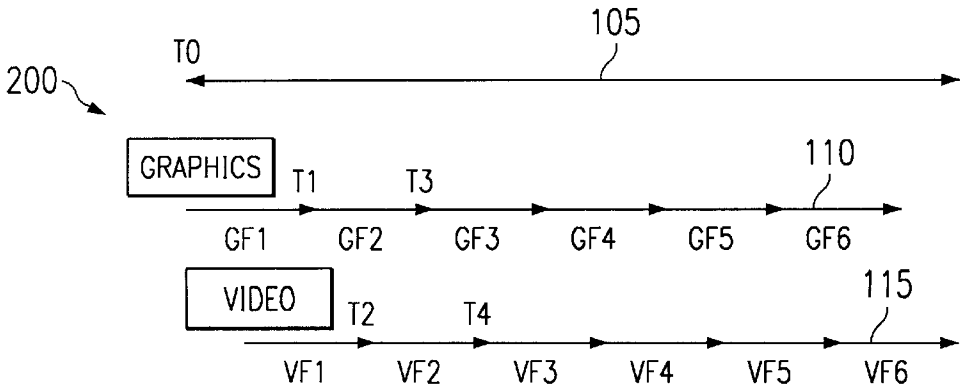
FIG. 2 illustrates a timeline diagram for a non-genlocked graphics refresh and a video source.

Referring now to FIG. 2, a timeline diagram 200 is depicted for a typical non-genlocked graphics refresh and a video source. Once again, the reference time-frame 105, the graphics refresh time-frame 110, and the video source time-frame 115 are chronologically illustrated. The video source time-frame 115, however, is not genlocked to the graphics refresh time-frame 110, that is, the vertical synchronization signal (hereinafter referred to as "vertical sync") of the incoming video is not aligned to the vertical sync of the graphics refresh. If only two buffers are provided, as is the case with the conventional solution described hereinabove in reference to FIG. 1B, it can be seen that from T0 to T2, the video port (not shown) is filling first buffer 131 (shown in FIG. 1B) with an incoming video frame (VF1). If a graphics refresh signal is provided at T1 on the time-frame 110 to start displaying video information from first buffer 131, a tearing anomaly will be perceived by the viewer because the entire first buffer 131 is not yet updated. On the other hand, if the graphics refresh signal is provided at T2 on the time-frame 115, the viewer would still see tearing because the graphics controller is switched in the middle of displaying a graphics frame (GF2) spanning T1–T3 on the time-frame 110 including the contents of second buffer 132 (shown in FIG. 1B). Further, if the graphics refresh signal is delayed until T3 on the time-frame 110, another video frame of information (VF2) is being provided during T2–T4 on the time-frame 115. It can be readily understood that this video frame cannot go into the first buffer 131 because the contents therein are being prepared for display at T3. Nor can this information go into the second buffer 132 as the contents therein are still being displayed. Although it is possible to drop the VF2 frame, such strategy would result in dropping far more frames than necessary, thereby causing syncopation artifacts.

Referring now to FIG. 3, a block diagram, generally at 300, is shown in accordance with the teachings of the present invention, wherein a third buffer may be advantageously provided for alleviating the difficulties described hereinabove with respect to non-genlocked graphics refresh and video sources. As before, graphics memory 130 comprises primary frame buffer 135, first buffer 131, and second buffer 132.

In addition, there is a third buffer 133. Primary frame buffer 135 controls the full-screen display on a monitor 125. First buffer 131, second buffer 132 and third buffer 133 store video information in video frames which are displayed in a PIP 126 on the monitor 125 in accordance with the teachings of the present invention.

FIGS. 4A and 4B illustrate an exemplary flow diagram for the display method that utilizes three buffers in accordance with the teachings of the present invention. After system start-up or initialization as provided in step 405, a video port (not shown) begins filling buffer B1 with a video frame of information. This is provided in step 406. If a graphics refresh signal is provided and if buffer B3 is full with a previously filled video frame, then the display system switches to displaying the contents of buffer B3, as provided in step 407. Further, if there are multiple graphics refresh signals during this period, the contents of buffer B3 are repeatedly provided to the display monitor. On the other hand, if there is no graphics refresh signal provided before the filling of buffer B1, as shown in step 408, then the contents of buffer B3 may be discarded.

Continuing to refer to FIGS. 4A and 4B, once the filling of buffer B1 with a video frame of information is completed, then the system begins to fill buffer B2 with the next video frame, as indicated in step 409. If there is a graphics refresh signal at this time, the contents of buffer B1 will now be displayed, as provided in step 410. Once again, in accordance with the teachings of the present invention, the contents of buffer B1 will be displayed as long as a graphics refresh signal is provided before completing the filling of buffer B2. If there is no graphics refresh signal during this period, the contents of buffer Bi will be discarded.

In step 411, the filling of buffer B2 with video information is completed. Thereafter, the system begins filling buffer B3 with the next video frame of information, as provided in step 412. The display system switches to displaying the contents of buffer B2 once a graphics refresh signal is provided, as shown in step 413. Once again, the contents of buffer B2 will be repeated or discarded in accordance with the teachings of the present invention. The system then completes the filling of buffer B3 in step 414. The flow control then passes to step 415 which requires starting the loop once again. This process may continue as long as there is video information to be displayed. Clearly, it can be readily understood that the display process may be interrupted by a system reset which may be user-initiated.

Those skilled in the art can appreciate that by providing a third buffer in accordance with the teachings of the present invention, the problem of tearing can be eliminated in a display system having a video source that is not genlocked to the graphics controller of the display system. Furthermore, it can be appreciated that the solution provided by the present invention is extremely simple yet highly effective. The present invention may be embodied in a variety of video port/graphics controller combinations. For example, in one embodiment, the present invention may be practiced predominantly using hardware modules that support triple-buffering. In another embodiment, hardware may be designed to provide an interrupt signal at the start of a blanking interval for video and to implement a method to latch changes to the buffer display only at a graphics blanking interval. In a yet another embodiment, hardware may be designed to provide an interrupt signal at the start of the blanking interval for both the video and graphics. As can be appreciated upon reference hereto, software plays an increasingly important role in second and third embodiments in comparison with the first embodiment.

Although only certain embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, numerous arrangements may be had for providing three buffers in accordance with the teachings of the present invention. The three buffers may be discrete stacks, or combined into a single data structure such as a circular buffer with suitable pointers. Further, more than three buffers for storing incoming video frames may be provided within the ambit of the present invention. Accordingly, all such extensions, modifications, rearrangements, substitutions and combinations are contemplated to be part of the scope of the present invention as defined by the following claims.

What is claimed is:

1. A display system having a computer, a video source, a graphics refresher and a display monitor, said graphics refresher at least for repeatedly providing a refresh signal for refreshing an image on said display monitor, comprising:

a first buffer for receiving a first portion of video data from said video source, said first portion comprising complete frame information displayable on said display monitor when said refresh signal is applied by said graphics refresher;

a second buffer for receiving a second portion of video data from said video source, said second portion comprising complete frame information displayable on said display monitor when said refresh signal is applied by said graphics refresher; and a third buffer for receiving a third portion of video data from said video source, said third portion comprising complete frame information displayable on said display monitor when said refresh signal is applied by said graphics refresher, wherein said graphics refresher generates signals for selectively displaying one of said first portion, said second portion and said third portion of video data on said display monitor such that said one of said first portion, said second portion and said third portion of video data is provided to said display monitor for display without inserting any null frames.

2. The display system as recited in claim 1, wherein said first buffer, said second buffer, and said third buffer are integrated into a single memory structure.

3. The display system as recited in claim 1, wherein said first buffer, said second buffer, and said third buffer are integrated into a single circular stack data structure.

4. The display system as recited in claim 1, wherein said first buffer and said second buffer are integrated into a single memory structure.

5. The display system as recited in claim 1, wherein said first buffer and said third buffer are integrated into a single memory structure.

6. The display system as recited in claim 1, wherein said second buffer and said third buffer are integrated into a single memory structure.

7. The display system as recited in claim 1, wherein each of said first complete frame, second complete frame, and third complete frame is provided to said display monitor for display as a picture-in-picture (PIP).

8. The display system of claim 7, wherein the first complete frame, the second complete frame and the third complete frame are different frames.

9. A method for providing live video from a video source on a computer system using a first buffer, a second buffer and a third buffer, the computer system having a display monitor controlled by a graphics refresher, said graphics refresher at least for repeatedly providing graphics refresh signal, comprising the steps of:

(A) commencing the filling of said first buffer with a first portion of video data from said video source;

(B) displaying the contents of said third buffer after said third buffer is full with a third portion of video data from said video source, as long as a graphics refresh signal is provided, said third portion comprising complete frame information provided to said display monitor, without any null frames inserted, when said graphics refresh signal is applied by said graphics refresher, otherwise discarding the contents of said third buffer;

(C) completing the filling of said first buffer with said first portion of video data from said video source;

(D) commencing the filling of said second buffer with a second portion of video data from said video source;

(E) displaying the contents of said first buffer after said first buffer is full with said first portion of video data from said video source, said first portion comprising complete frame information provided to said display monitor, without any null frames inserted, when said refresh signal is applied by said graphics refresher, as long as a graphics refresh signal is provided, otherwise discarding the contents of said first buffer;

(F) completing the filling of said second buffer with said second portion of video data from said video source;

(G) commencing the filling of said third buffer with said third portion of video data from said video source;

(H) displaying the contents of said second buffer after said second buffer is full with said second portion of video data from said video source, without any null frames inserted, as long as a graphics refresh signal is provided, said second portion comprising complete frame information provided to said display monitor, otherwise discarding the contents of said second buffer;

(I) completing the filling of said third buffer with said third portion of video data from said video source; and (J) repeating steps (A) through (I) until a system reset.

10. A display system, comprising:

a video source generating video information at a first frequency;

a graphics refresher providing a refresh signal to a display monitor at a second frequency; and at least three buffers for storing said video information provided by said video source, each buffer storing a complete frame, wherein said complete frame is provided to said display monitor without inserting any null frames upon application of said refresh signal.

11. The display system as recited in claim 8, wherein:

said first frequency equals said second frequency.

12. The display system as recited in claim 10, wherein said plurality of buffers equals three buffers.

13. The display system as recited in claim 10, wherein each said complete frame stored by a buffer is provided to said display monitor for display as a picture-in-picture (PIP).

14. The display system of claim 13, wherein the first complete frame, the second complete frame and the third complete frame are different frames.

* * * * *